(12) United States Patent
Itoh et al.

(10) Patent No.: US 7,161,349 B2
(45) Date of Patent: Jan. 9, 2007

(54) MAGNETIC ROTATION ANGLE SENSOR

(75) Inventors: Tomohiro Itoh, Kariya (JP); Takamitsu Kubota, Kariya (JP); Yoshiyuki Kono, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/432,549

(22) Filed: May 12, 2006

(65) Prior Publication Data
US 2006/0261804 A1 Nov. 23, 2006

(30) Foreign Application Priority Data
May 17, 2005 (JP) ............................ 2005-143991
Mar. 10, 2006 (JP) ............................ 2006-065506

(51) Int. Cl.
*G01B 7/30* (2006.01)
*G01R 33/07* (2006.01)
(52) U.S. Cl. ........................ 324/207.25; 324/207.2; 324/251

(58) Field of Classification Search ........... 324/207.25, 324/207.2, 251
See application file for complete search history.

(56) References Cited

U.S. PATENT DOCUMENTS

| 6,137,288 A | 10/2000 | Luetzow |
| 6,417,664 B1 | 7/2002 | Ventroni et al. |
| 6,472,865 B1 | 10/2002 | Tola et al. |
| 6,509,734 B1 | 1/2003 | Luetzow |
| 6,646,435 B1 | 11/2003 | Nakamura et al. |
| 6,956,368 B1 | 10/2005 | Johnson et al. |

*Primary Examiner*—Bot LeDynh
(74) *Attorney, Agent, or Firm*—Nixon & Vanderhye P.C.

(57) ABSTRACT

In a magnetic rotation angle sensor for detecting a rotation angle of a detection target, a yoke covers outer circumferences of a magnet and a Hall device. One of the magnet and the magnetic flux density detection device rotates together with the detection target. The Hall IC is radially shifted from a rotation center of the detection target. The magnetic flux density detection device has a detection surface that is in parallel to one of a tangential direction and a normal direction of a turning circle. The magnet is magnetized in the one of the tangential direction and the normal direction of the turning circle.

4 Claims, 7 Drawing Sheets

MAGNETIC ROTATION ANGLE SENSOR

CROSS REFERENCE TO RELATED APPLICATION

This application is based upon and claims the benefit of priority of Japanese Patent Applications No. 2005-143991 filed on May 17, 2005 and No. 2006-065506 filed on Mar. 10, 2006, the contents of which are incorporated herein by reference.

FIELD OF THE INVENTION

The present invention relates to a magnetic rotation angle sensor for sensing a rotation angle of a detection target.

BACKGROUND OF THE INVENTION

Conventionally, a magnetic rotation angle sensor, which senses a rotation angle of a detection target by rotating one of a magnet and a magnet detection device together with a detection target, to detect a magnetic flux direction variation or a magnetic flux density, is proposed (refer to U.S. Pat. No. 6,646,435 and its counterpart JP-2001-91208-A, which are referred to as Reference 1 in the following, and U.S. Pat. No. 6,137,288, U.S. Pat. No. 6,417,664, U.S. Pat. No. 6,472,865, U.S. Pat. No. 6,509,734, U.S. Pat. No. 6,956,368 and their counterpart JP-3411523-B2, which are referred to as Reference 2 in the following, for example).

In the magnetic rotation angle sensor according to Reference 1, a magnetic detection device is installed on an inner circumferential side of a magnet that is magnetized in a radial direction of a turning circle of a detection target, to be shifted from a center of the turning circle. A yoke covers outer circumferences of the magnet and the magnetic detection device. A rotation angle range of the detection target, in which the output of the magnetic detection device is linear, is extended by decreasing an angle of the magnetic flux, which is detected by the magnetic detection device, relative to the rotation angle of the detection target.

In the magnetic rotation angle sensor according to Reference 2, a magnetic flux density detection device rotates together with a detection target, and is installed on a radially shifted position from a rotation center, relative to a magnet that is formed in a substantially semicircular shape and magnetized in a radial direction of a turning circle of the detection target. Then, the magnetic flux density detection device detects the magnetic flux density that varies in accordance with a rotation of the semicircular magnet, to sense a rotation angle of the detection target.

However, as shown in FIG. 12, in the magnetic rotation angle sensor according to Reference 1, when a magnetoresistive device is used as the magnetic detection device, the rotation angle can be detected only in a range smaller than 180 degrees at the maximum, even if the output of the magnetoresistive device is linear over an extended rotation angle range. When a Hall effect device is used as the magnetic flux density detection device, the magnetic flux angle is calculated with a ratio between outputs of two Hall effect devices. This construction increases the number of parts, and raises a manufacturing cost. Further, the magnetic rotation angle sensor has such a magnetic circuit construction that the magnetic detection device is installed on the inner circumferential side of the magnet and the yoke covers the outer circumferences of the magnet and the magnetic detection device. Accordingly, the magnet is closer to the yoke than the magnetic detection device is. The magnetic flux generated by the magnet flows much toward the yoke than toward the magnetic detection device in this magnetic circuit construction, to cause an issue to decrease an output level of the magnetic detection device. The magnetic flux quantity generated by the magnet can be increased by forming the magnet in a large size, however, this causes another issue to upsize an entire size of the magnetic rotation angle sensor.

The magnetic rotation angle sensor according to Reference 2 does not extend a rotation angle range of the detection target in which the output of the magnetic detection device is linear, differently from Reference 1. That is, as shown in a voltage sensing signal waveform graph of FIG. 4B or 3B of Reference 2, the rotational angle range of the detection target, in which the output of the magnetic detection device is linear to be detected by the magnetic flux density detection device, is smaller than 180 degrees. Further, the magnetic flux density detection device is installed on a rotation path of the semicircular magnet, so that the magnetic flux density detection device hinders a movement of the magnet. Thus, the rotation angle range of the magnet is mechanically limited.

SUMMARY OF THE INVENTION

The present invention is achieved in view of the above-described issues, and has an object to provide a small magnetic rotation angle sensor in which a magnet and a magnetic flux density detection device do not hinder each other from relatively rotating, and a rotation angle of a detection target can be detected without increasing the number of the magnetic flux density detection device.

The magnetic rotation angle sensor has: a magnet that generates a magnetic flux; a magnetic flux density detection device that detects a magnetic flux density of the magnetic flux; and a yoke that covers outer circumferences of the magnet the magnetic flux density detection device. One of the magnet and the magnetic flux density detection device rotates together with the detection target. The magnetic flux density detection device is radially shifted from a rotation center of the detection target. The magnetic flux density detection device has a detection surface that is in parallel to one of a tangential direction and a normal direction of a turning circle of the detection target. The magnet is magnetized in the one of the tangential direction and the normal direction of the turning circle and is installed on an inner circumferential side of the magnetic flux density detection device to be radially shifted from the rotation center.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

First Embodiment

Figure 1:
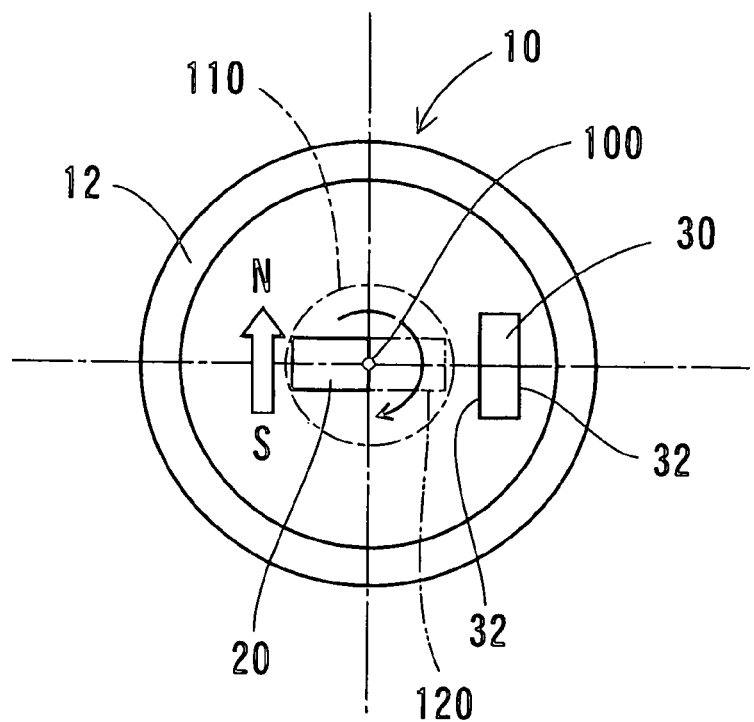
FIG. 1 is a schematic diagram showing a construction of a magnetic rotation angle sensor according to a first embodiment of the present invention.

FIG. 1 depicts a magnetic rotation angle sensor 10 according to a first embodiment of the present invention. The magnetic rotation angle sensor 10 is a device for detecting a rotation angle of a detection target such as a throttle valve element. The magnetic rotation angle sensor 10 has a yoke 12, a magnet 20 and a Hall IC 30, which is an example of the magnetic flux density detection device according to the present invention. A Hall effect device may substitute for the Hall IC 30. The yoke 12 covers outer circumferences of the magnet 20 and the Hall IC 30.

The yoke 12 is formed from magnetic material into a cylindrical shape. The magnet 20 is a permanent magnet that rotates integrally with the detection target and is installed on a radially shifted position from a rotation center 100 of the detection target. The magnet 20 is magnetized along a turning circle of the detection target. The Hall IC 30 is installed on a radially shifted position from the rotational center 100. The Hall IC 30 is on an outer circumferential side of a rotation path 110 of the magnet 20, which corresponds to the turning circle of the detection target, not to hinder a rotation of the magnet 20. A detection surface 32 of the Hall IC 30 is in parallel to a tangential direction of the turning circle of the detection target. The Hall IC 30 detects the magnetic flux density passing through the detection surface 32. A magnitude of the magnetic flux density, which is detected by the Hall IC 30, varies in accordance with a rotation angle of the magnet 20 and a distance between the magnet 20 and the Hall IC 30.

Figure 2A:
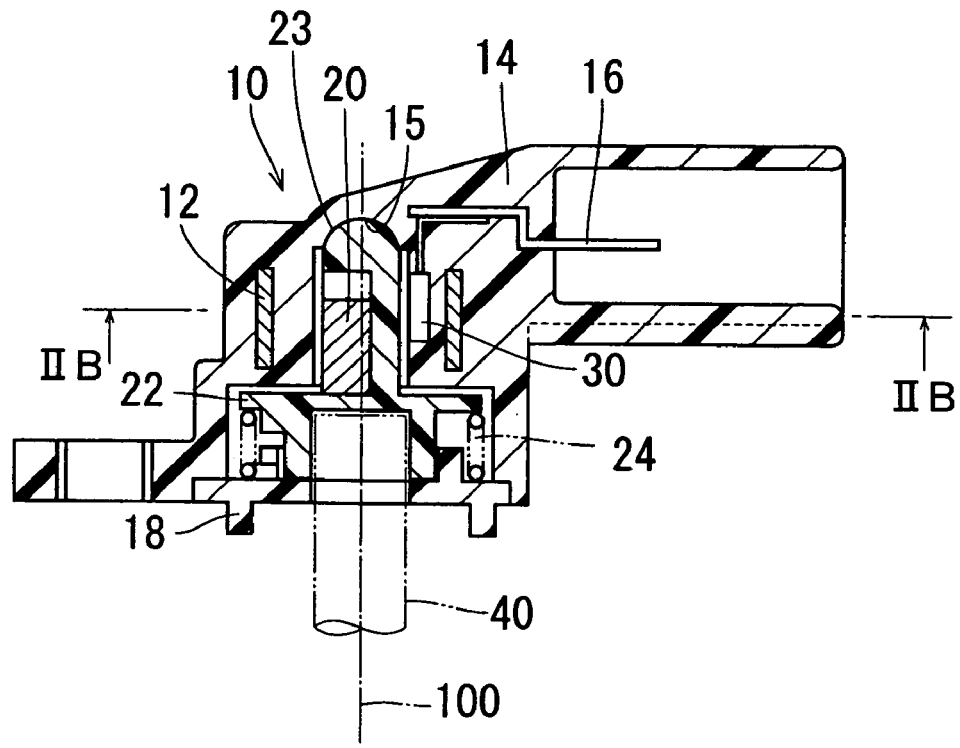
FIG. 2A is a cross-sectional view showing the magnetic rotation angle sensor according to the first embodiment.
Figure 2B:
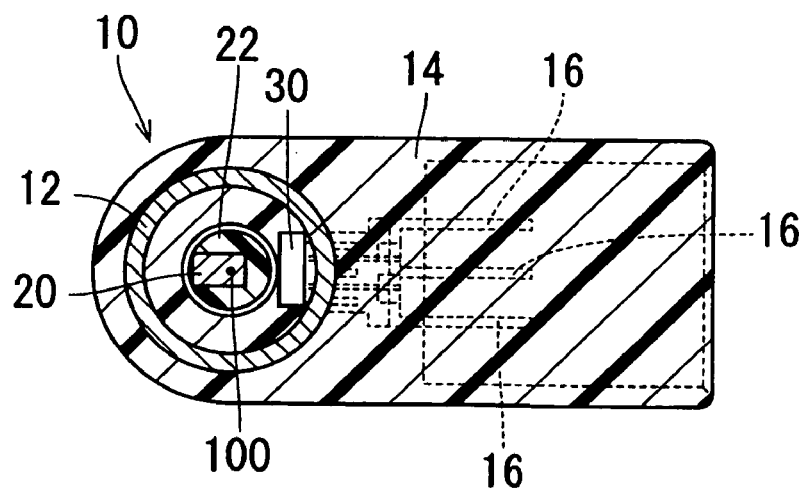
FIG. 2B is another cross-sectional view showing the magnetic rotation angle sensor, taken along a line B—B of FIG. 2A.

FIGS. 2A and 2B depict the construction the magnetic rotation angle sensor 10 in detail. The magnet 20 is embedded in a resinous rotor 22 by insert molding. The resinous rotor 22 is integrally connected to a shaft 40 of the throttle device, so that the resinous rotor 22 rotates together with the shaft 40. A resinous housing 14 and a resinous cover 18 cover the rotor 22. In the housing 14 is formed a concave surface 15, which is in sliding contact with a convex leading end surface 23 of the rotor 22. A spring 24 urges the leading end surface 23 of the rotor 22 onto the concave surface 15 of the housing 14. The yoke 12 and the Hall IC 30 are embedded in the housing 14 by insert molding. Terminals 16 are in electrical contact with the Hall IC 30, to lead an output of the Hall IC 30 outward.

Figure 3:
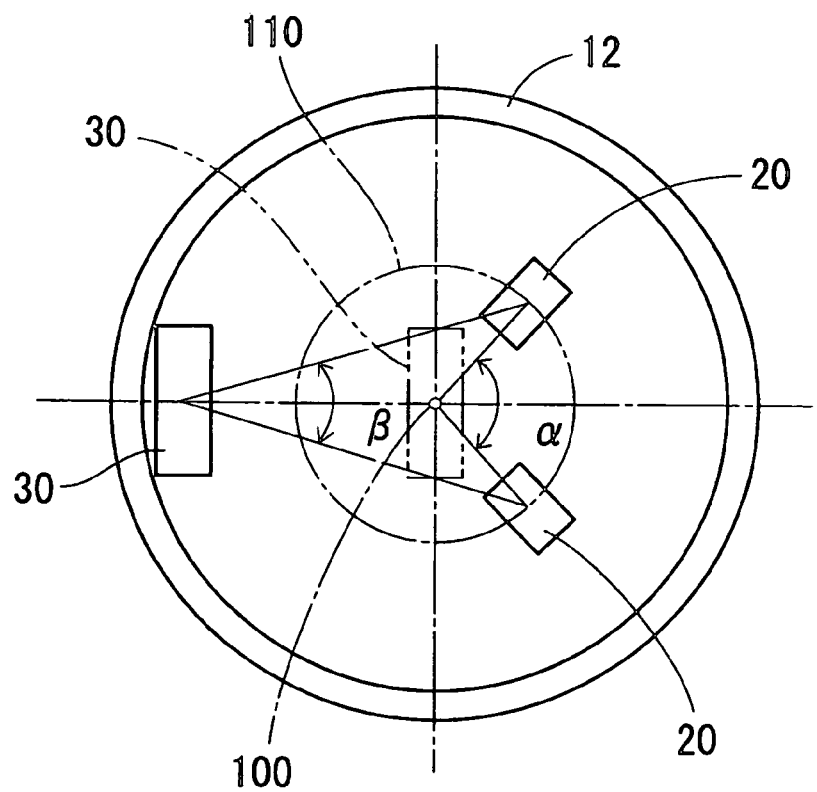
FIG. 3 is a schematic diagram showing an offset distance of a Hall IC of the magnetic rotation angle sensor according to the first embodiment.
Figure 4:
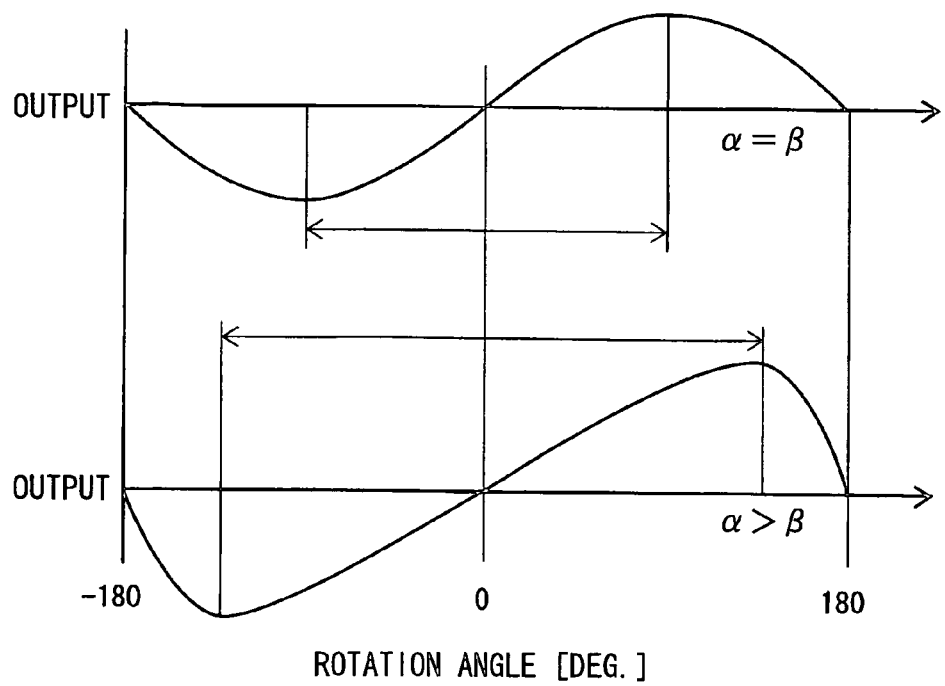
FIG. 4 is a graph showing an output characteristic of the Hall IC associated with to the offset distance.

An operation of the magnetic rotation angle sensor 10 is described in the following. As described above, the magnet 20 and the Hall IC 30 are respectively shifted from the rotation center 100 in the radial direction. The Hall IC 30 is located on an outer circumferential side of the magnet 20. Conversely, the magnet 20 is located on an inner circumferential side of the Hall IC 30. As shown in FIG. 3, the rotation angle α of the detection target, that is, a rotation angle of the magnet 20 about the rotation center 100, and a magnetic flux detection angle β of the Hall IC 30, which the magnet 20 forms with the Hall IC 30 when the magnet 20 is rotated by the rotation angle α, are in a relation of α>β in this arrangement. If the Hall IC 30 is located on the rotation center 100, α is equal to β(α>β) as indicated by a chain double-dashed line in FIG. 3, and an output characteristic of Hall IC 30 is as shown in an upper graph of FIG. 4. When α is larger than β(α>β), the output characteristic of the Hall IC 30 is as shown in a lower graph of FIG. 4. A rotation angle to maximize the output of the Hall IC 30 is closer to +180 degrees than that on a condition of α=β, which is shown in the upper graph of FIG. 4. Similarly, a rotation angle to minimize the output of the Hall IC 30 is closer to −180 degrees than that on the condition of α=β. As a result, the output of the Hall IC 30 has a large linearity in a wider rotation angle range. Accordingly, a condition of α>β extends a detection angle range in which the Hall IC 30 can detect the rotation angle of the detection target.

Figure 5A:
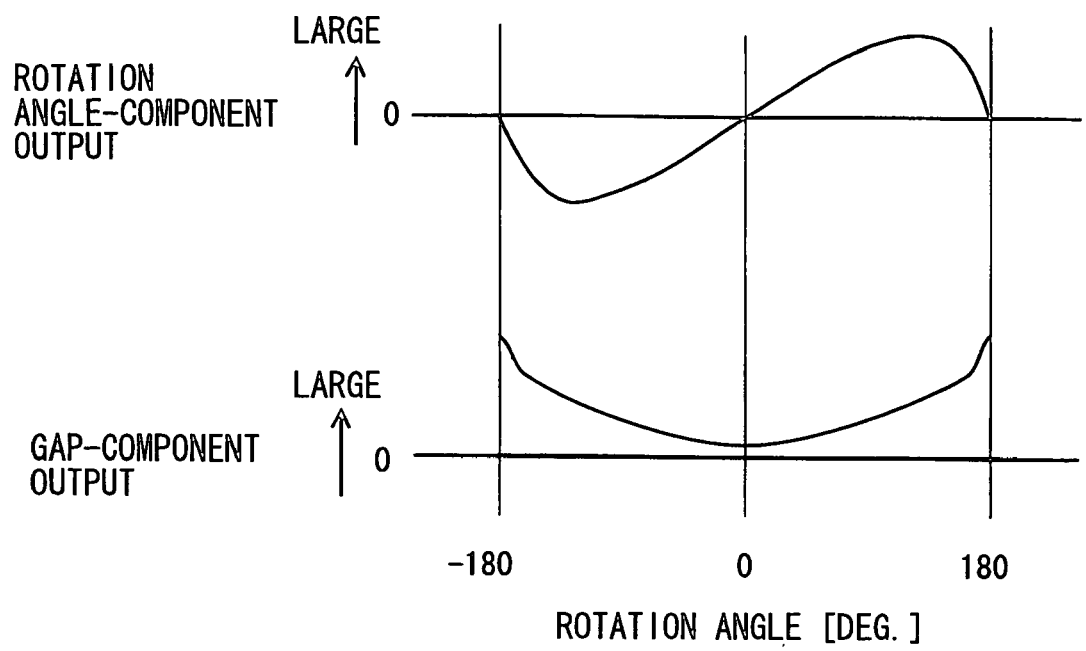
FIG. 5A is a graph showing a rotation angle-component output and a gap-component output of the Hall IC relative to a rotation angle.

The detection angle range increase, which is provided by the arrangement of the Hall IC 30 radially shifted from the rotation center 100, can be described in another way as follows. The magnet 20 is magnetized in a tangential direction of the turning circle of the detection target, or a turning circle of the shaft 40, and the detection surface 32 of the Hall IC 30 is in parallel to the tangential direction of the turning circle of the shaft 40. Accordingly, a rotation angle component output of the Hall IC 30, which is due to the rotation angle of the magnet 20 and not due to the gap distance between the magnet 20 and the Hall IC 30, has a characteristic as shown in an upper graph of FIG. 5A, by defining a rotation angle of the magnet 20 shown in FIG. 1 as 0 degree.

The magnet 20 rotates on an inner circumferential side of the Hall IC 30. Thus, the magnet 20 comes closest to the Hall IC 30 to minimize the gap between the magnet 20 and the Hall IC 30 when it is rotated by +180 degrees or −180 degrees with respect to a rotation angle of 0 degree shown in FIG. 1. Accordingly, a gap-component output characteristic of the Hall IC 30, which is due to the gap distance between the magnet 20 and the Hall IC 30 and not due to the rotation angle of the magnet 20, is as shown in a lower graph of FIG. 5A. The magnetic rotation angle sensor 10 in FIG. 1, generates a composite output shown in FIG. 5B, which is a resultant of the rotation angle-component output and the gap-component output respectively shown in FIG. 5A.

Figure 5B:
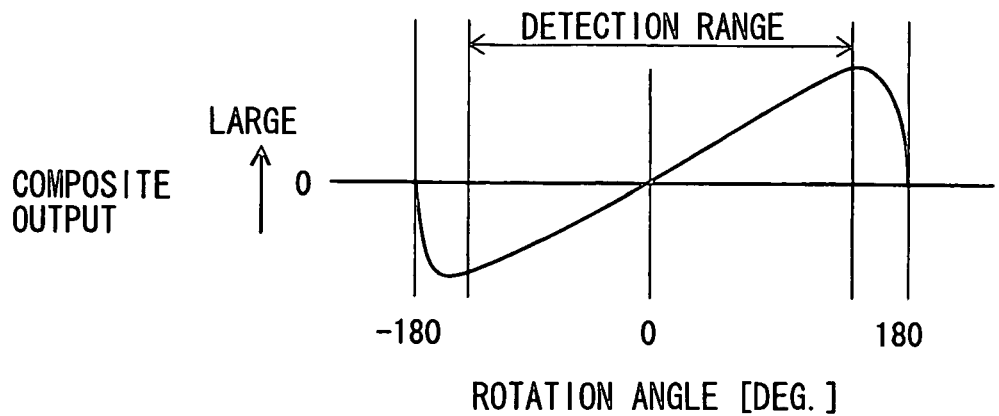
FIG. 5B is a graph showing a composite output of the Hall IC relative to the rotation angle.

The gap-component output gradually increases from the rotation angle of 0 degree to a rotation angle of +180 degrees or −180 degrees, which corresponds to a position 120 indicated by a chain double-dashed line in FIG. 1 to bring the magnet 20 closest to the Hall IC 30. Accordingly, in FIG. 5B, a rotation angle to maximize the composite output of the Hall IC 30 is closer to +180 degrees than that without a consideration of the gap, and a rotation angle to minimize the composite output of the Hall IC 30 is closer to −180 degrees. As a result, in the magnetic rotation angle sensor 10, a rotation angle range of the magnet 20, that is, a rotation angle range of the shaft 40, in which the output of the Hall IC 30 is approximately linear as shown in FIG. 5B, is wider than that of the rotation angle-component output shown in FIG. 5A.

Figure 6:
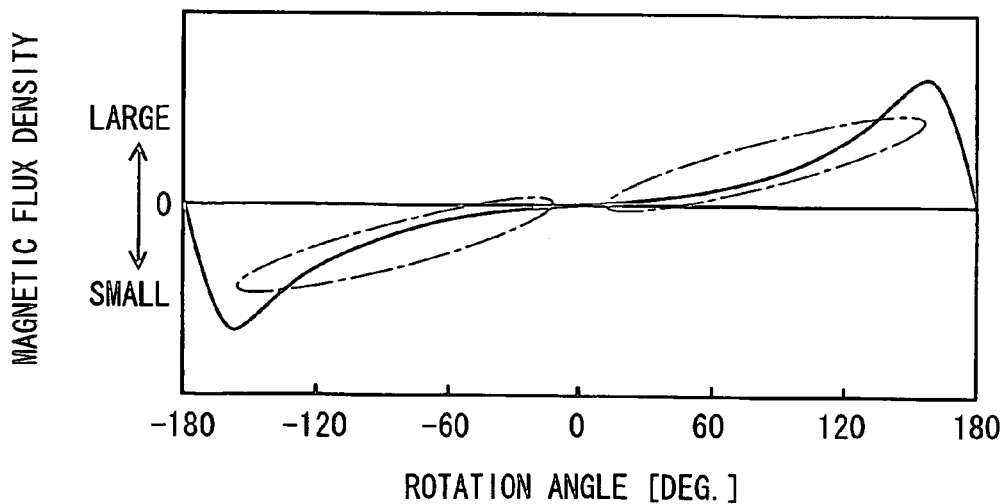
FIG. 6 is a graph showing a retroversion in the magnetic flux density characteristic detected by the Hall IC.

FIG. 6 depicts an output of the Hall IC 30 by a magnetic field analytic simulation when the magnet 20 and the Hall IC 30 are located in positions shown in FIG. 1. In the output by the analytical simulation, the rotation angle to maximize the output of the Hall IC 30 is shifted toward +180 degrees, and the rotation angle to minimize the output of the Hall IC 30 is shifted toward −180 degrees. However, the output by the analytic simulation has retroversions on both sides of the rotation angle of 0 degree, to decrease the linearity of the output of the Hall IC 30. This output characteristic has a small linearity, so that the rotation angle cannot be detected with high accuracy. Accordingly, it is desirable to decrease the retroversions in the output of the Hall IC 30, to increase the linearity of the output of the Hall IC 30.

A condition for decreasing the retroversion in the output characteristic of the Hall IC 30 and improving the linearity of the output characteristic of the Hall IC 30 can be obtained by a magnetic field analytic simulation of the output of the Hall IC 30 with a magnetic analysis program. However, it is necessary to set various parameters in the magnetic field analytic simulation with the conventional magnetic field analysis program, to complicate a simulation process and to extend a simulation time. From this regard, the inventors of the present invention attempted to obtain the condition for improving the linearity of the output of the Hall IC 30 with an approximate expression of the magnetic flux density detected by the Hall IC 30. Firstly, a construction and a magnetic property of the magnetic rotation angle sensor 10 are simplified into an analytical model shown in FIG. 7.

A relation between an offset distance L of the magnet 20 radially shifted from the rotation center 100 and an offset distance a(L) of the Hall IC 30 radially shifted from the rotation center 100 is expressed as a(L)=L+k, wherein k denotes a constant determined by the dimensions of the magnet 20 and the Hall IC 30. It is desirable to locate the Hall IC 30 as close as possible to the magnet 20 within confines that the Hall IC 30 does not obstruct the magnet 20 during the rotation of the detection target. Thus, the constant k is set to a valve as small as possible in accordance with the dimensions of the magnet 20 and the Hall IC 30. It is assumed that the magnetic flux extending to the Hall IC 30 originates at a center of the magnet 20 in the following.

Figure 7:
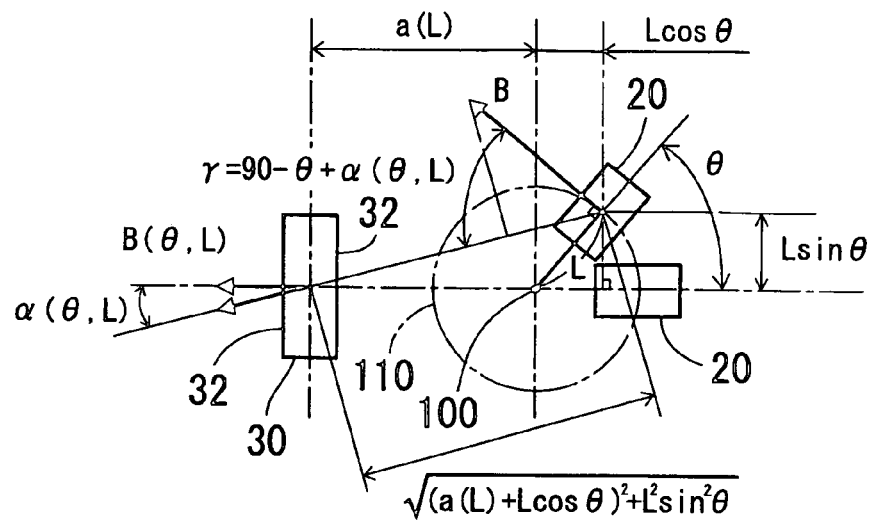
FIG. 7 is a schematic diagram showing an analytical model of the electromagnetic rotation angle sensor according to the first embodiment.

In the following is described an angle term of the magnetic flux, that is, a detection value component of the magnetic flux originated in the magnet 20 and flowing to the Hall IC 30, which is due to the rotation angle θ in the analytical model shown in FIG. 7

An angle γ that is formed between a magnetic flux of the magnet 20, which is magnetized in a tangential direction to the rotation path 110, and a magnetic flux originated in a center of the magnet 20 and flowing to the Hall IC 30, is calculated in accordance with the following formula (1). An angle α(θ, L) that is formed between a straight line, which passes through the rotation center 100 and the center of the Hall IC 30, and the magnetic flux, which originates in the center of the magnet 20 and flows to the Hall IC 30, are calculated in accordance with the following formula (2).

$$\gamma=90-\theta+\alpha(\theta,L) \quad (1)$$

$$\alpha(\theta,L)=\tan^{-1}(L\sin\theta/(a(L)+L\cos\theta)) \quad (2)$$

Accordingly, the magnetic flux density $B_0$ originated in the magnet 20 and flowing to the Hall IC 30 is expressed as the following formula (3), wherein B denotes a magnetic flux density of the magnet 20, which is magnetized in the tangential direction to the rotation path 110.

$$B_0=B\cos(90-\theta+\alpha(\theta,L)) \quad (3)$$

Based on the formula (3), a magnetic flux density-component $B_1$, which is perpendicular to and detected by the detection surface 32 of the Hall IC 30, is expressed as the following formula (4).

$$B_1=B\cos(90-\theta+\alpha(\theta,L))\cos(\alpha(\theta,L)) \quad (4)$$

The formula (4) represents the angle term of the magnetic flux density, which is due to a rotation angle θ of the magnet 20 that is detected by the Hall IC 30.

In the following is described a gap term of the magnetic flux, that is, a detection value component of the magnetic flux originated in the magnet 20 and flowing to the Hall IC 30, which is due to a gap distance between the magnet 20 and the Hall IC 30. A magnetic flux density detected by the Hall IC 30 varies inversely with the square of the distance between the magnet 20 and the Hall IC 30. A reciprocal of the square of the distance between the magnet 20 and the Hall IC 30 is expressed as the following formula (5).

$$1/((a(L)+L\cos\theta)^2+L^2\sin^2\theta) \quad (5)$$

The magnetic flux density B(θ,L) detected by the Hall IC 30 is a product of the angle term of the formula (4) and the gap term of formula (5), and expressed as the following formula (6).

$$B(\theta,L)=B\cos(90-\theta+\alpha(\theta,L))\cos(\alpha(\theta,L))/((a(L)+L\cos\theta)^2+L^2\sin^2\theta) \quad (6)$$

A characteristic of the magnetic flux density B(θ,L) to be detected by the Hall IC 30 is obtained based on the formula (6) as generally the same as a characteristic of the magnetic flux density by the magnetic field analytic simulation, an analytical result of which is shown in FIG. 6. That is, the characteristic of the magnetic flux density B(θ,L) based on the formula (6) has retroversions on both sides of the rotation angle of 0 degree, as the characteristic shown in FIG. 6. Accordingly, a condition for reducing the retroversion can be analyzed based on the formula (6), which approximates the magnetic flux density detected by the Hall IC 30.

As described above, the offset distance of the Hall IC 30 is expressed as a(L)=L+k, in which k does not vary if the dimensions of the magnet 20 and the Hall IC 30 are not changed. Thus, the offset distance a(L) of the Hall IC 30 is in correlation with the offset distance L of the magnet 20. That is, the formula (6) is a function of the offset distance L of the magnet 20 and the rotation angle θ. In the following is described an analytical result of the linearity of the characteristic of the magnetic flux density in detail, based on the formula (6) in which the offset distance L of the magnet 20 is a parameter.

Figure 8:
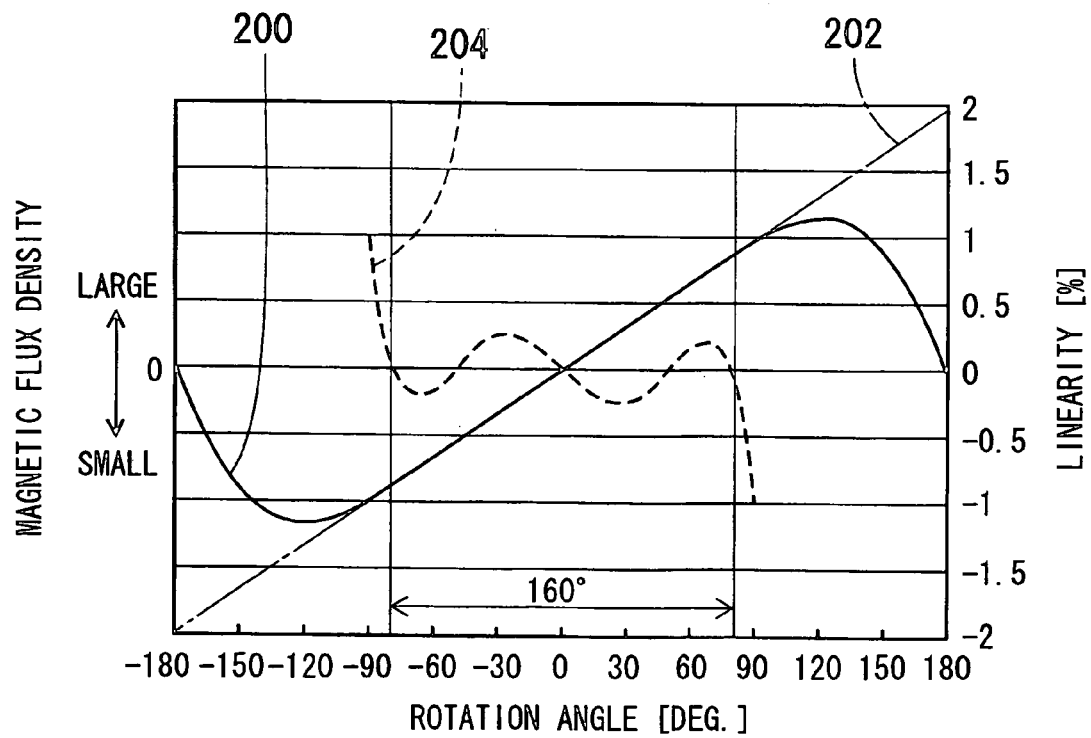
FIG. 8 is a graph showing a magnetic flux density characteristic detected by the Hall IC, an approximated straight line of the magnetic flux density characteristic and a linearity of the magnetic flux density detected by the Hall IC.

A curved line 200 shown in FIG. 8 depicts a magnetic flux density characteristic detected by the Hall IC 30. The straight line 202 is an approximated straight line that approximates to a curved line 200 in a certain rotation angle range centered on 0 degree, and depicts a desirable output characteristic of the Hall IC 30. The curved line 204 depicts a percentage of a linearity of an increase and decrease of the curved line 200 relative to the straight line 202. A smaller percentage of the linearity indicates a larger linearity, and a larger percentage of the linearity indicates a smaller linearity. In the following, a condition for a maximum linearity, i.e., a maximum value of the percentage of the linearity of 1% or smaller within a rotation angle range centered on 0 degree and with a width of at least 160 degrees.

Figure 9:
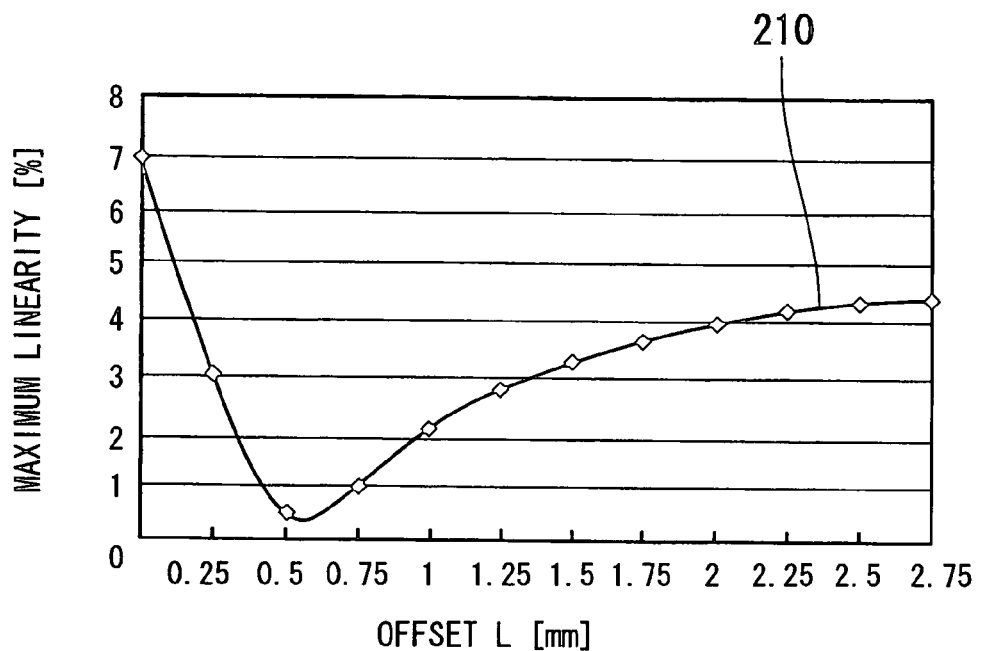
FIG. 9 is a graph showing a maximum linearity characteristic of the magnetic flux density detected by the Hall IC.
Figure 10:
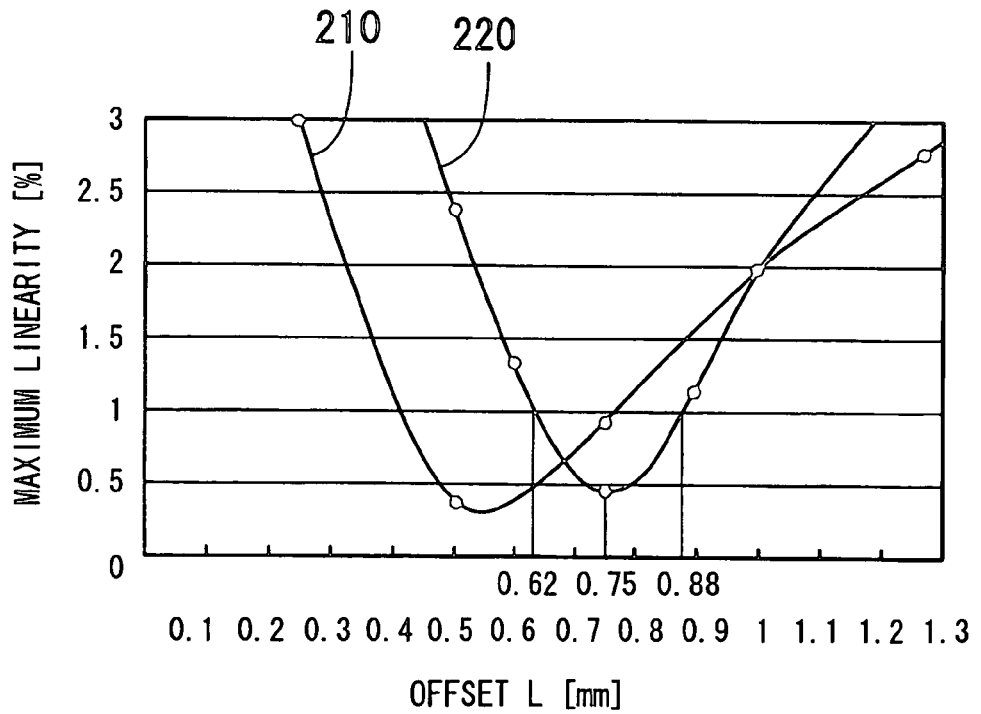
FIG. 10 is a graph showing maximum linearity characteristics of the magnetic flux density by an approximate equation and a magnetic field analytic simulation.

In FIG. 9, a curved line 210 depicts a variation of the maximum linearity based on the formula (6) in which the offset distance L of the magnet 20 is varied within the rotation angle range centered on 0 degree and with a width of 160 degrees. As shown in FIG. 9, the maximum linearity is minimized, that is, optimized in the vicinity of L=0.55 mm, and becomes 1% or smaller in a offset range of approximately 0.44 mm$\leq$L$\leq$0.76 mm. A magnetic flux model is simplified in the analysis of the linearity of the characteristic of the magnetic flux density based on the formula (6). Accordingly, the analytical result includes an error larger than that in an accurate magnetic field analytic simulation with a conventional magnetic field analysis program. From this regard, the magnetic field analytic simulations are conducted on conditions of the offset distances of L=0.5 mm, L=0.55 mm and L=0.6 mm, to obtain a gradient of the characteristic curve in the neighborhood of the offset distance of L=0.55 mm. An optimum value of the linearity in the magnetic field analytic simulation is on a larger side of the offset distance of L=0.55 mm. In FIG. 10, a curved line 220 depicts a variation of the maximum linearity of an approximated characteristic of the magnetic flux density based on the magnetic field analytic simulation conducted on a condition of the offset distance larger than L=0.6 mm, in terms of the above-mentioned optimum value of the linearity on the larger side of the offset distance of L=0.55 mm. The curved line 220 satisfies the condition of the maximum linearity of 1% or smaller approximately in an offset distance range of 0.62 mm$\leq$L$\leq$0.88 mm.

A prototype of the magnetic rotation angle sensor 10, which is based on the analytical result of the magnetic field analytic simulation, is built and evaluated. The prototype specification of the magnetic rotation angle sensor 10 for the evaluation is as follows.

| | |
|---|---|
| Outer diameter of yoke 12: | 11.5 mm |
| Dimension of Hall IC 30: | 4.06 mm × 1.5 mm × 4.05 mm |
| Dimension of magnet 20: | 2 mm × 2.6 mm × 5.7 mm |
| Offset distance L of magnet: | 0.62 mm $\leq$ L $\leq$ 0.88 mm |

An evaluation result of the prototype of the magnetic rotation angle sensor 10 satisfied the maximum linearity of 1% or smaller in the rotation angle range centered on 0 degree and with a width of 160 degrees. Accordingly, it is considered to specify the offset distance L of the magnet 20 in a range of 0.0539D$\leq$L$\leq$0.0766D, based on a ratio between the outer diameter D of the yoke 12 (D=11.5 mm) and the range of the offset distance L of the magnet 20 (0.62 mm$\leq$L$\leq$0.88 mm).

As described above, in the magnetic rotation angle sensor 10 according to the first embodiment, the offset distance L of the magnet 20 is specified in the range of 0.0539D$\leq$L$\leq$0.0766D, so that the maximum linearity is 1% or smaller over the rotation angle range centered on 0 degree and with a width of 160 degrees.

Further, in the magnetic rotation angle sensor 10 according to the first embodiment, the magnet 20 is located on an inner circumferential side of the yoke 12 to be radially shifted from the rotation center 100 and on the inner circumferential side of the Hall IC 30. Thus, the distance between the magnet 20 and the yoke 12 is larger than the distance between the Hall IC 30 and the yoke IC 12. Accordingly, the magnetic flux generated by the magnet 20 flows much to the yoke 12, to increase the magnetic flux quantity flowing to the Hall IC 30, in comparison with a construction in which the magnet 20 is located on an outer circumferential side of the Hall IC 30. As a result, it is possible to gain a desirable output level from the Hall IC 30 by using a relatively small magnet 20. Accordingly, the magnetic rotation angle sensor 10 can be downsized.

Furthermore, the rotation angle to maximize a detection voltage of the Hall IC 30 is shifted toward +180 degrees, and the rotation angle to minimize the detection voltage of the Hall IC 30 is shifted toward −180 degrees. Thus, it is possible to detect the rotation angle of the shift 40 over a rotation angle range of approximately 300 degrees with only one Hall IC 30, although the maximum linearity of the magnetic flux density characteristic is not always 1% or smaller.

Still further, the Hall IC 30 is located on the outer circumferential side of the magnet 20, so that the Hall IC 30 does not hinder the magnet 20 from rotating. Accordingly, it is possible to detect the rotation angle of the detection target over the rotation angle range in which the Hall IC 30 can detect the rotation angle.

Second Embodiment

Figure 11:
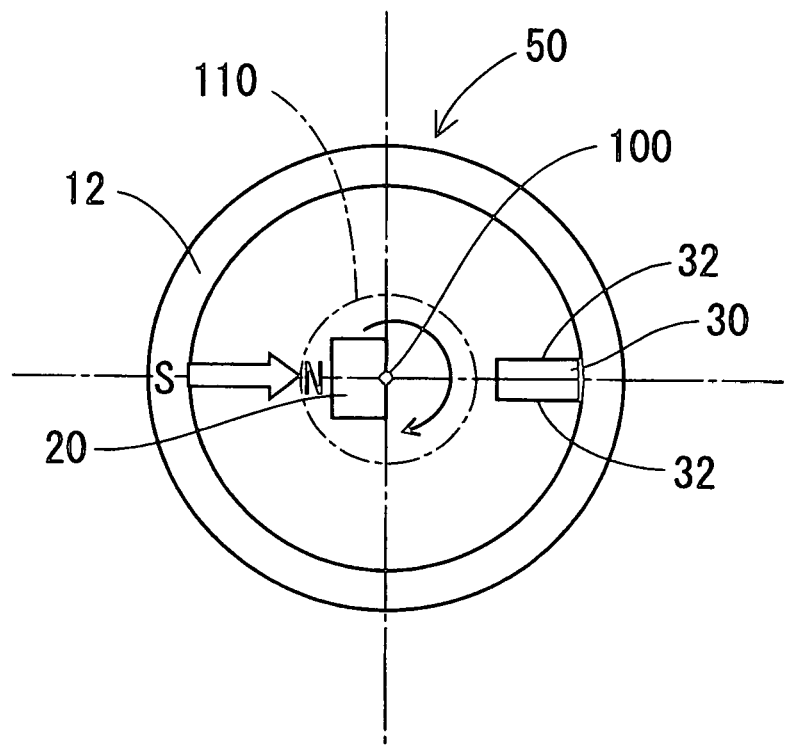
FIG. 11 is a schematic diagram showing a construction of a magnetic rotation angle sensor according to a second embodiment of the present invention.
Figure 12:
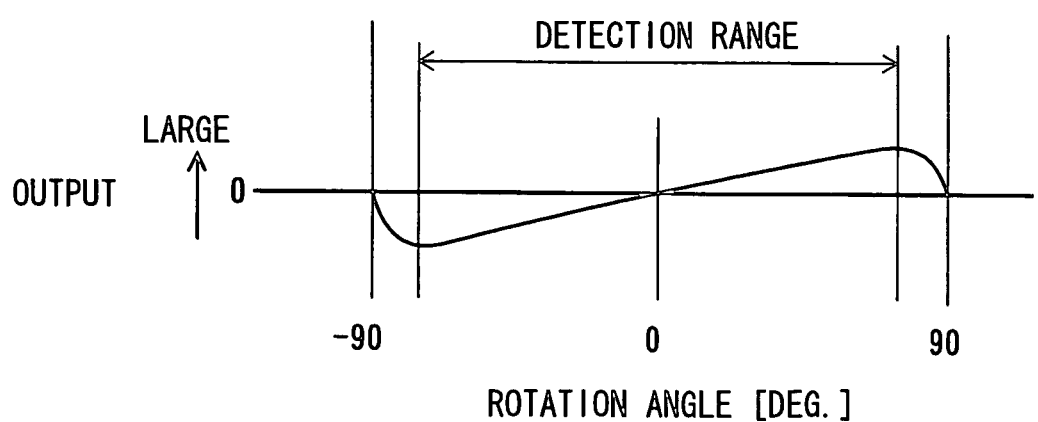
FIG. 12 is a graph showing an output characteristic of a conventional rotation angle sensor relative to a rotation angle.

FIG. 11 depicts an electromagnetic rotation angle sensor 50 according to a second embodiment of the present invention. In FIG. 11, components, to which the same referential numerals are assigned as in the first embodiment, are substantially the same as those in the first embodiment.

In the magnetic rotation angle sensor 50 according to the second embodiment, the magnet 20 is magnetized in a normal direction of the rotation path 110, which corresponds to the turning circle of the detection target. The detection surface 32 of the Hall IC 30 is in parallel to the normal direction of the rotation path 110. As in the first embodiment, the yoke 12 covers the outer circumferences of the magnet 20 and the Hall IC 30. Further, each of the magnet 20 and the Hall IC 30 is radially shifted from the rotation center 100. The magnet 20 is located on the inner circumferential side of the Hall IC 30.

By the above described magnetization direction of the magnet 20 and the arrangement of detection surface 32 of the Hall IC 30 and positions of the yoke 12, the magnet 20 and the Hall IC 30, the rotation angle of the detection target to maximize the detection voltage of the Hall IC 30 is shifted toward +180 degrees, and the rotation angle to minimize the detection voltage is shifted toward −180 degrees. Thus, it is possible to extend a rotation angle detection range of the Hall IC 30 with only one Hall IC 30.

Further, also in the second embodiment, the linearity of the magnetic flux density characteristic, which is detected by the Hall IC 30, is improved by adjusting the offset distance L of the magnet 20. Thus, it is possible to detect the rotation angle of the detection target with high accuracy.

Other Embodiments

In the above-described embodiments, the magnet 20 rotates together with the detection target. Alternatively, the electromagnetic rotation angle sensor according to the present invention may have such a construction that not the magnet 20 but the Hall IC 30 rotates together with the detection target.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. A magnetic rotation angle sensor for detecting a rotation angle of a detection target, the sensor comprising:
    a magnet that generates a magnetic flux;
    a magnetic flux density detection device that detects a magnetic flux density of the magnetic flux; and
    a yoke that covers outer circumferences of the magnet and the magnetic flux density detection device, one of the magnet and the magnetic flux density detection device rotating together with the detection target,
   wherein: the magnetic flux density detection device is radially shifted from a rotation center of the detection target;
    the magnetic flux density detection device has a detection surface that is in parallel to one of a tangential direction and a normal direction of a turning circle of the detection target; and
    the magnet is magnetized in the one of the tangential direction and the normal direction of the turning circle and is installed on an inner circumferential side of the magnetic flux density detection device to be radially shifted from the rotation center.

2. The magnetic rotation angle sensor according to claim 1, wherein the magnetic flux density detection device is a Hall effect device.

3. The magnetic rotation angle sensor according to claim 1, wherein the magnet rotates together with the detection target.

4. The magnetic rotation angle sensor according to claim 1, wherein:
    the yoke has an approximately cylindrical shape; and
    an offset distance between a center of the magnet and the rotation center satisfies a relation of:

$0.0539D \leq L \leq 0.0766D$, wherein D denotes an outer diameter of the yoke, and L denotes the offset distance.

* * * * *